United States Patent [19]

Knox, III et al.

[11] Patent Number: 4,851,272
[45] Date of Patent: Jul. 25, 1989

[54] PLASTICS FILM LAMINATES

[75] Inventors: Walter H. Knox, III, Rockingham County; Ronald E. Layne, Waynesboro, both of Va.

[73] Assignee: Reynolds Metals Company, Richmond, Va.

[21] Appl. No.: 205,522

[22] Filed: Aug. 26, 1988

Related U.S. Application Data

[62] Division of Ser. No. 907,386, Sep. 15, 1986, Pat. No. 4,778,699.

[51] Int. Cl.$^4$ ............................................. B37N 5/02
[52] U.S. Cl. ................................... 428/35.2; 428/219; 428/216; 428/349; 428/515; 428/35.3; 428/35.4
[58] Field of Search ............... 428/349, 216, 515, 35, 428/219

[56] References Cited

U.S. PATENT DOCUMENTS

| | | | |
|---|---|---|---|
| 3,956,254 | 5/1976 | St. Eve et al. | 526/352.2 |
| 4,147,827 | 4/1979 | Breidt et al. | 428/218 |
| 4,151,318 | 4/1979 | Marshall | 428/35 |
| 4,271,280 | 6/1981 | Tomura et al. | 526/352.2 |
| 4,412,042 | 10/1983 | Matsura et al. | 526/352 X |
| 4,418,114 | 11/1983 | Briggs et al. | 428/218 |
| 4,427,833 | 11/1984 | Edwards | 526/352.2 X |
| 4,608,286 | 8/1986 | Motoishi | 428/35 |
| 4,617,241 | 10/1986 | Mueller | 428/520 |
| 4,671,987 | 6/1987 | Knott, II et al. | 428/216 |
| 4,684,573 | 8/1987 | Mueller et al. | 428/349 |

FOREIGN PATENT DOCUMENTS 1031251 2/1986 Japan ................................. 428/516

Primary Examiner—Edith Buffalow
Attorney, Agent, or Firm—Alan T. McDonald

[57] ABSTRACT

Multi-layer plastics film laminate structures are disclosed. These structures have particular utility as inner and outer layers of multi-layer bag structures or as single layer bag structures, particularly for use in bag-in-box applications.

46 Claims, 1 Drawing Sheet

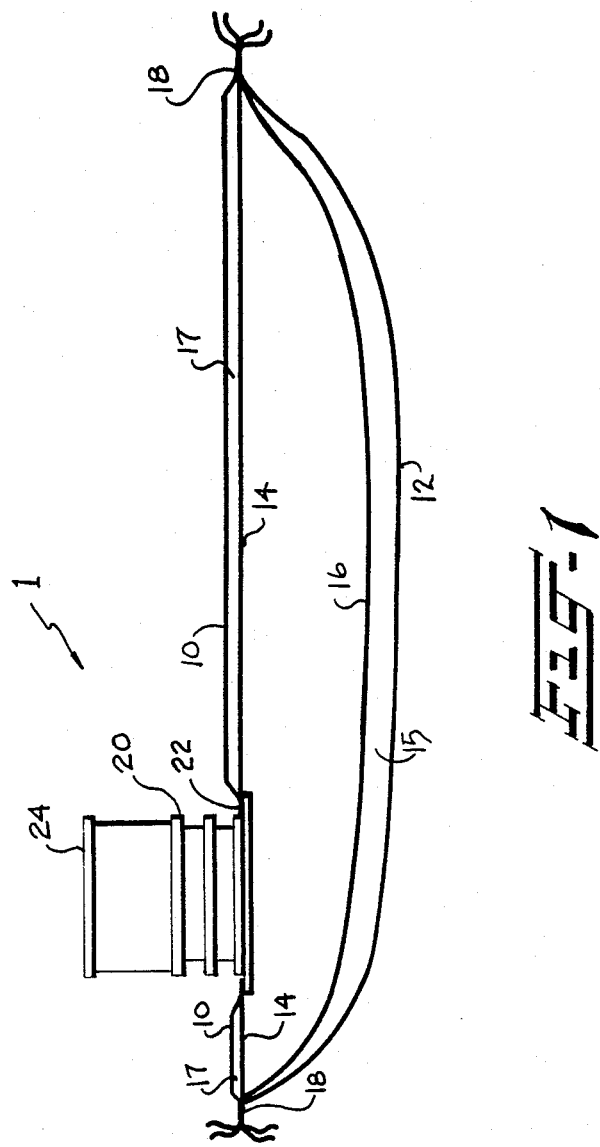

PLASTICS FILM LAMINATES

This application is a division of Ser. No. 907,386 filed Sept. 15, 1986 now U.S. Pat. No. 4,778,699.

BACKGROUND OF THE INVENTION

Bag-in-box containers are becoming increasingly popular for use in containing various liquids, especially wine, soft drink syrup concentrates, condiments, such as ketchup, and the like.

The bag-in-box structure consists of a corrugated cardboard or paperboard carton containing a bag into which the fluid contents are placed. The bag includes a filling gland and a figment covering the filling gland. Such structures are well-known and need not be described further in detail.

In order to operate satisfactorily in bag-in-box operations, the bag structure must have sufficient toughness to withstand jostling within the corrugated carton without leakage when filled with the product, and must have sufficient oxygen barrier properties to prevent oxygen penetration to the product within it. At the same time, the bag structure must be economical in terms of material usage and material cost.

THE PRESENT INVENTION

By means of the present invention, improved bag structures for use in bag-in-box environments are obtained. The present invention provides multi-layer plastics film laminates which may be employed as inner bag structures and/or outer bag structures when a two-ply bag is formed or which may be employed in forming single ply bags. The laminates provide increased toughness and abuse resistance compared to known bag structures, while maintaining sufficient oxygen barrier properties to permit these films to be used in the bag-in-box environment.

BRIEF DESCRIPTION OF THE DRAWING

The invention will be more fully described with reference to the FIGURE which is a partial cross-sectional view of a bag for use in a bag-in-box system employing the laminates of the present invention.

DETAILED DESCRIPTION OF THE PREFERRED EMBODIMENTS

Turning now to the FIGURE, a bag 1 for use in a bag-in-box environment is illustrated. The bag 1, as shown, is a two-ply structure, having outer layers 10 and 12 and inner layers 14 and 16. The outer layers 10 and 12 are of identical structure and the inner layers 14 and 16 are of identical structure. The four layers are heat sealed along their outer periphery along a heat seal line 18 and are sealed along a sealing flange 22 of a gland 20 over which a figment 24 is placed. The figment 24 may be a cap or may be in the form of a finger-operated valve, as is well-known in the art.

As can be seen in the FIGURE, other than at their heat seals 18 and 22, the inner layers 14 and 16 are not connected to the outer layers 10 and 12, having air spaces 17 and 15 therebetween. It should be noted that the air spaces 17 and 15 as illustrated are highly exaggerated for purposes of illustration. All that is actually required is that the inner layers 14 and 16 be freely moveable with respect to outer layers 10 and 12.

It should be noted that with certain of the laminates of the present invention, inner layers 14 and 16 are not required. In such a single ply embodiment, the outer layers 10 and 12 would be heat sealed directly to one another along periphery 18.

The present invention resides in the laminates forming the outer or only layers 10 and 12 and the inner layers 14 and 16. It is to these laminate structures that the balance of this disclosure is directed.

The outermost layers of the laminate, in each embodiment, should have a relatively slippery surface, i.e., a coefficient of friction of less than about 1.0, and preferably, about 0.2. Thus, a slip additive and/or an anti-block additive may be included in these layers.

According to a first embodiment of the present invention, the inner layers 14 and 16 may each be formed as either a 5 or a 10 component laminate. If a 5 layer laminate is desired, the laminate takes the form A-B-C-B-D, while if a 10 layer laminate is desired, the laminate takes the form A-B-C-B-D-D-B-C-B-A, i.e., the 10 layer laminate in actuality comprises two of the five layer laminates in mirror projection. All ranges of gauges and preferred gauges given below are for a 10 layer laminate; if a 5 layer laminate is desired, these gauges should be doubled.

Component A is selected from the group consisting of ethylene vinyl acetate and linear low density polyethylene. If ethylene vinyl acetate is employed, it is preferred that the vinyl acetate content be from about 4 to about 18 percent by weight, and preferably about 12 percent by weight. Component A may have a gauge ranging between about 0.2 and 0.8 mils, and is preferably about 0.4 mils.

Component B is selected from the group consisting of ethylene vinyl acetate, as described above, linear low density polyethylene and low density polyethylene. This component may have a gauge ranging between 0.05 and 0.2 mils, and preferably 0.1 mils.

Component C is selected from the group consisting of ethylene vinyl acetate, as described above, linear low density polyethylene and very low density polyethylene. Very low density polyethylene, as used herein, is a polyethylene having a density less than or equal to 0.91 grams per cubic centimeter. This component may have a gauge ranging between about 0.1 and 0.5 mils, and preferably about 0.15 mils.

Component D is selected from the group consisting of ethylene vinyl acetate, as described above, linear low density polyethylene and very low density polyethylene, as described above. This component may have a gauge ranging between about 0.1 and 0.8 mils, and preferably about 0.25 mils.

It should be noted that in the above constructions, it is necessary that at least one of components C and/or D be very low density polyethylene. In the 10 layer structures, it is preferred that component D be very low density polyethylene. It is also preferred that at least 25%, and preferably at least 40%, of the total thickness of the laminate be very low density polyethylene. If component D is very low density polyethylene in a 5 layer structure, a slip and/or an anti-block additive should be added to the very low density polyethylene due to the tackiness of this material. The coefficient of friction of the modified layer should be less than about 1.0 and preferably about 0.2. The overall gauge of the laminate, whether 5 or 10 layers, may be between about 1.5 and 3.0 mils, and preferably about 2.0 mils.

The above constructions may be formed, for example, by coextruding the five layers A-B-C-B-D as a blown bubble, as is common in the art, and separating the bubble into the five layer structure. If the 10 layer structure is desired, the same five layer bubble may be blown, with the bubble then being collapsed upon itself to form the 10 layer structure by a heat bond between the two 5 layer structures.

According to a second embodiment of the present invention, inner layers 14 and 16 may be formed as either a 3 or a6 component laminate. If a 3 layer laminate is desired, the laminate takes the form A-B-A, while if a 6 layer laminate is desired, the laminate takes the form A-B-A-A-B-A; i.e., the 6 layer laminate in actuality comprises two of the 3 layer laminates in mirror projection. The ranges of gauges and preferred gauges given below are for a 6 layer laminate. If a 3 layer laminate is desired, the gauges should be doubled.

In this embodiment, component A is ethylene vinyl acetate, as described above, having a gauge ranging between about 0.1 and 0.7 mils, and is preferably about 0.3 mils.

Component B is very low density polyethylene, as described above, having a gauge ranging between about 0.1 and 0.8 mils, and is preferably about 0.4 mils.

Whether the 3 or 6 layer laminate is formed, the overall gauge may range between about 1.5 and 3.0 mils, and preferably is about 2.0 mils.

An outer layer 10 or 12 may be formed of the identical 3, 5, 6 or 10 layer structures described above. In these embodiments, a component F is adhesively secured by a component E to a pair of the 3, 5, 6 or 10 layer structures, resulting in a structure taking the form A-B-A-E-F-E-A-B-A, A-B-C-B-D-E-F-E-D-B-C-B-A, A-B-A-A-B-A-E-F-E-A-B-A-A-B-A or A-B-C-B-D-D-B-C-B-A-E-F-E-A-B-C-B-D-D-B-C-B-A.

Component F is a metallized polyethylene terephthalate film having the metallized surface thereof attached to the component D or A and having a gauge ranging between about 0.25 and 1.0 mils, and preferably about 0.48 mils.

Component E is an adhesive and may be, for example, a polyester type adhesive, having a gauge ranging between about 0.05 and 0.2 mils, and is preferably about 0.1 mils.

An alternative film for the outer layers 10 and 12 of a multi-ply bag structure, which does not require a metallized component, also employs the A-B-C-B-D or A-B-C-B-D-D-B-C-B-A structure. Again, the range of gauges and preferred gauges are given for the 10 layer structure and would be doubled for a 5 layer structure, with one exception noted below.

In this structure, component A may be an ethylene vinyl acetate, as described above, having a gauge ranging between about 0.5 and 1.5 mils, and preferably about 1.0 mils, or a linear low density polyethylene having a gauge ranging between about 0.5 and 1.2 mils, and preferably about 0.7 mils.

Component B may be an ethylene vinyl acetate, as described above, having a gauge ranging between about 0.1 and 0.5 mils, and preferably about 0.25 mils, linear low density polyethylene having a gauge ranging between about 0.1 and 0.5 mils, and preferably about 0.2 mils, or an adhesive tie layer formed of a polyethylene or ethyl vinyl acetate-based thermoplastic adhesive, having a gauge ranging between about 0.1 and 0.25 mils, and preferably about 0.1 mils. If a tie layer is employed, its gauge does not change between a 5 and a 10 layer structure.

Component C may be an ethylene vinyl acetate, as described above, having a gauge ranging between about 0.2 and 1.0 mils, and preferably about 0.4 mils, linear low density polyethylene having a gauge ranging between about 0.2 and 1.0 mils, and preferably about 0.3 mils, very low density polyethylene, as described above, having a gauge ranging between about 0.2 and 1.0 mils, and preferably about 0.3 mils, a polyethylene terephthalate-based co-polyester, such as that sold by Eastman Kodak under the tradename PETG, having a gauge ranging between about 0.1 and 0.5 mils, and preferably about 0.25 mils, and an ethylene vinyl alcohol having a gauge ranging between about 0.1 and 0.5 mils, and preferably about 0.25 mils.

Component D may be an ethylene vinyl acetate, as described above, having a gauge ranging between about 0.5 and 1.5 mils, and preferably about 0.8 mils, very low density polyethylene, as described above, having a gauge ranging between about 0.3 and 1.2 mils, and preferably about 0.6 mils, and linear low density polyethylene having a gauge ranging between about 0.3 and 1.2 mils, and preferably about 0.6 mils.

It is again required that at least one of components C and/or D be very low density polyethylene, and especially preferred that component D be very low density polyethylene, with the limitation that very low density polyethylene should not form a surface layer of the structure unless a slip and/or an anti-block additive is included in the very low density polyethylene, as described above. The laminate may have an overall gauge, whether formed as a 5 or 10 layer structure, of between 3.0 to 6.0 mils, and preferably about 4.5 mils.

As previously mentioned, the inner and outer bag laminate films could be replaced by a single layer film. Such a laminated film again has the structure A-B-C-B-D or A-B-C-B-D-D-B-C-B-A.

The single layer bag film has the same components as the all-plastic outer bag film described above, but the film layers have different gauge ranges than in the all-plastic outer film structure. Once more, the ranges of gauges and preferred gauges given below are for the 10 layer structures, and would be doubled for a 5 layer structure.

In this case, component A may be an ethylene vinyl acetate, as described above, and may have a gauge ranging between about 1.0 and 2.0 mils, and preferably about 1.7 mils or a linear low density polyethylene having a gauge ranging between about 0.5 and 1.5 mils and preferably about 1.0 mils.

Component B may be an ethylene vinyl acetate, as described above, having a gauge ranging between about 0.1 and 0.5 mils, and preferably about 0.25 mils, linear low density polyethylene having a gauge ranging between about 0.1 and 0.5 mils and preferably about 0.2 mils, or a polyethylene or ethyl vinyl acetate-based thermoplastic adhesive layer having a gauge ranging between about 0.1 and 0.25 mils, and preferably about 0.1 mils. Again, if an adhesive tie layer is used as component B, its gauge does not change between the 5 and 10 layer structures.

Component C may be an ethylene vinyl acetate, as described above, having a gauge ranging between about 0.5 and 1.5 mils and preferably about 0.7 mils, linear low density polyethylene having a gauge ranging between about 0.3 and 1.0 mils, and preferably about 0.5 mils, very low density polyethylene, as described above, having a gauge ranging between about 0.3 and 1.0 mils, and preferably about 0.5 mils, a polyethylene terephthalate-based co-polyester, as described above, having a gauge ranging between about 0.1 and 0.5 mils, and preferably about 0.25 mils, and an ethylene vinyl alcohol having a gauge ranging between about 0.1 and 0.5 mils, and preferably about 0.25 mils.

If high oxygen barrier properties are required for this single film structure, component C should be ethylene vinyl alcohol or PETG. Where oxygen barrier properties are less of a concern and increased toughness is desired, component C should be very low density polyethylene.

Component D may be formed of an ethylene vinyl acetate, as described above, having a gauge ranging between about 0.7 and 2.0 mils, and preferably about 1.4 mils, linear low density polyethylene having a gauge ranging between about 0.5 and 2.0 mils, and preferably about 1.0 mils, and very low density polyethylene, as described above, having a gauge ranging between about 0.5 and 2.0 mils, and preferably about 1.0 mils.

Once again, it is required that at least one of components C and/or D be formed of very low density polyethylene, and most preferred that component D be formed of very low density polyethylene, so long as no surface layer is formed from very low density polyethylene unless a slip and/or an anti-block additive is included in the very low density polyethylene, as described above. The overall laminate, whether a 5 or a 10 layer structure, may have a gauge of between about 4.0 and 8.0 mils, and preferably about 6.0 mils.

When employing the film structures of the present invention, in bag-in-box structures, bags having acceptable oxygen barrier properties and increased toughness in use are formed.

While the invention has been described with reference to certain specific embodiments thereof, it is not intended to be so limited thereby, except as set forth in the accompanying claims.

We claim:

1. A multi-component plastics resin film laminate, said laminate having the structure A-B-A, wherein
   Component A is ethylene vinyl acetate;
   Component B is very low density polyethylene having a density of less than 0.91 grams per cubic centimeter.

2. The laminate of claim 1 wherein said ethylene vinyl acetate has a vinyl acetate content of from about 4 to about 18 percent by weight.

3. The laminate of claim 2 wherein said ethylene vinyl acetate has a vinyl acetate content of about 12 percent by weight.

4. The laminate of claim 1 wherein said laminate has an overall gauge of between about 1.5 and 3.0 mils.

5. The laminate of claim 4 wherein said laminate has an overall gauge of about 2.0 mils.

6. The laminate of claim 1 wherein component A has a gauge of between about 0.2 and 1.4 mils.

7. The laminate of claim 6 wherein component A has a gauge of about 0.6 mils.

8. The laminate of claim 1 wherein component B has a gauge of between about 0.2 and 1.6 mils.

9. The laminate of claim 8 wherein component B has a gauge of about 0.8 mils.

10. A multi-component plastics resin film laminate, said laminate having the structure A-B-A-A-B-A, wherein
    Component A is ethylene vinyl acetate; and
    Component B is very low density polyethylene having a density of less than 0.91 grams per cubic centimeter.

11. The laminate of claim 10 wherein said ethylene vinyl acetate has a vinyl acetate content of from about 4 to about 18 percent by weight.

12. The laminate of claim 11 wherein said ethylene vinyl acetate has a vinyl acetate content of about 12 percent by weight.

13. The laminate of claim 10 wherein said laminate has an overall gauge of between about 1.5 and 3.0 mils.

14. The laminate of claim 13 wherein said laminate has an overall gauge of about 2.0 mils.

15. The laminate of claim 10 wherein component A has a gauge of between about 0.1 and 0.7 mils.

16. The laminate of claim 15 wherein component A has a gauge of about 0.3 mils.

17. The laminate of claim 10 wherein component B has a gauge of between about 0.1 and 0.8 mils.

18. The laminate of claim 17 wherein component B has a gauge of about 0.4 mils.

19. A multi-component plastics resin film laminate, said laminate having the structure A-B-A-E-F-E-A-B-A, wherein
    Component A is ethylene vinyl acetate;
    Component B is very low density polyethylene having a density of less than 0.91 grams per cubic centimeter;
    Component E is an adhesive tie layer; and
    Component F is metallized polyethylene terepthalate.

20. The laminate of claim 19 wherein said adhesive tie layer is a polyester type adhesive.

21. The laminate of claim 19 wherein said ethylene vinyl acetate has a vinyl acetate content of from about 4 to about 18 percent by weight.

22. The laminate of claim 21 wherein said ethylene vinyl acetate has a vinyl acetate content of about 12 percent by weight.

23. The laminate of claim 21 wherein said laminate has an overall gauge of between about 3.3 and 7.4 mils.

24. The laminate of claim 23 wherein said laminate has an overall gauge of about 4.68 mils.

25. The laminate of claim 21 wherein component A has a gauge of between about 0.2 and 1.4 mils.

26. The laminate of claim 25 wherein component A has a gauge of about 0.6 mils.

27. The laminate of claim 21 wherein component B has a gauge of between about 0.2 and 1.6 mils.

28. The laminate of claim 27 wherein component B has a gauge of about 0.8 mils.

29. The laminate of claim 21 wherein component E has a gauge of between about 0.05 and 0.2 mils.

30. The laminate of claim 29 wherein component E has a gauge of about 0.1 mils.

31. The laminate of claim 21 wherein component F has a gauge of between about 0.25 and 1.0 mils.

32. The laminate of claim 31 wherein component F has a gauge of about 0.48 mils.

33. A multi-component plastics resin film laminate, said laminate having the structure A-B-A-A-B-A-E-F-E-A-B-A-A-B-A, wherein
    Component A is ethylene vinyl acetate;
    Component B is very low density polyethylene having a density of less than 0.91 grams per cubic centimeter;
    Component E is an adhesive tie layer; and
    Component F is metallized polyethylene terepthalate.

34. The laminate of claim 33 wherein said adhesive tie layer is a polyester type adhesive.

35. The laminate of claim 33 wherein said ethylene vinyl acetate has a vinyl acetate content of from about 4 to about 18 percent by weight.

36. The laminate of claim 35 wherein said ethylene vinyl acetate has a vinyl acetate content of about 12 percent by weight.

37. The laminate of claim 33 wherein said laminate has an overall gauge of between about 3.3 and 7.4 mils.

38. The laminate of claim 37 wherein said laminate has an overall gauge of about 4.68 mils.

39. The laminate of claim 33 wherein component A has a gauge of between about 0.1 and 0.7 mils.

40. The laminate of claim 39 wherein component A has a gauge of about 0.3 mils.

41. The laminate of claim 33 wherein component B has a gauge of between about 0.1 and 0.8 mils.

42. The laminate of claim 41 wherein component B has a gauge of about 0.4 mils.

43. The laminate of claim 33 wherein component E has a gauge of between about 0.05 and 0.2 mils.

44. The laminate of claim 43 wherein component E has a gauge of about 0.1 mils.

45. The laminate of claim 33 wherein component F has a gauge of between about 0.25 and 1.0 mils.

46. The laminate of claim 45 wherein component F has a gauge of about 0.48 mils.

* * * * *